(12) United States Patent
Lowles

(10) Patent No.: US 9,531,207 B2
(45) Date of Patent: Dec. 27, 2016

(54) HOLSTER FOR SUPPORTING AND CHARGING THE WIRELESS HEADSET OF HANDHELD DEVICES

(71) Applicant: Research In Motion Limited, Waterloo (CA)

(72) Inventor: Robert J. Lowles, Waterloo (CA)

(73) Assignee: BlackBerry Limited, Waterloo (CA)

( * ) Notice: Subject to any disclaimer, the term of this patent is extended or adjusted under 35 U.S.C. 154(b) by 754 days.

(21) Appl. No.: 13/723,353

(22) Filed: Dec. 21, 2012

(65) Prior Publication Data

US 2013/0113419 A1 May 9, 2013

Related U.S. Application Data

(63) Continuation of application No. 10/787,173, filed on Feb. 27, 2004, now Pat. No. 8,346,324.

(30) Foreign Application Priority Data

Aug. 5, 2003 (GB) .................................. 0318357.1

(51) Int. Cl.
*H02J 7/00* (2006.01)
*H04M 1/04* (2006.01)

(52) U.S. Cl.
CPC ............ *H02J 7/0044* (2013.01); *H02J 7/0054* (2013.01); *H04M 1/04* (2013.01)

(58) Field of Classification Search
CPC ....... Y02E 60/12; H02J 7/0042; H02J 7/0045; H02J 7/0044; H02J 7/0054; H01M 10/44; H01M 10/46; H01M 10/0045; H04M 1/04
USPC ........................................................ 320/107
See application file for complete search history.

(56) References Cited

U.S. PATENT DOCUMENTS

| | | | | |
|---|---|---|---|---|
| 5,610,979 A | * | 3/1997 | Yu | .............................. A45F 5/02 379/426 |
| 5,696,496 A | | 12/1997 | Kumar | |
| 5,771,438 A | | 6/1998 | Palermo et al. | |
| 5,926,006 A | * | 7/1999 | Burroughs | ............ H02J 7/0004 320/114 |

(Continued)

FOREIGN PATENT DOCUMENTS

| | | |
|---|---|---|
| DE | 10134830 | 2/2003 |
| DE | 101134830 | 2/2003 |

(Continued)

OTHER PUBLICATIONS

European Patent Application No. 09152382.9 Search Report dated Nov. 9, 2009.

(Continued)

*Primary Examiner* — Richard Isla Rodas
*Assistant Examiner* — Mohammed J Sharief
(74) *Attorney, Agent, or Firm* — Borden Ladner Gervais LLP; Todd Keeler

(57) ABSTRACT

A holster for use with a handheld device and a peripheral device is disclosed herein. The holster provides a mating structure for holding a peripheral device so that a mobile device charges the peripheral device. The holster removes the inconvenience of having to charge a peripheral off a battery charger at work or home by permitting the peripheral to charge off the handheld device. The holster can be used with any handheld device and peripheral device, such as a cellular phone and a wireless headset.

10 Claims, 11 Drawing Sheets

(56) References Cited

U.S. PATENT DOCUMENTS

| | | | |
|---|---|---|---|
| 6,923,688 B1 | 8/2005 | Burson et al. | |
| 6,978,163 B2 | 12/2005 | Dyer et al. | |
| 7,565,187 B1 * | 7/2009 | Dynok | A45F 5/021 455/557 |
| 2004/0116161 A1 * | 6/2004 | Grivas | H04W 52/027 455/574 |
| 2004/0266370 A1 * | 12/2004 | Ulrichsen | H02J 7/0031 455/123 |
| 2014/0354235 A1 * | 12/2014 | Chauhdary | B60L 11/1816 320/128 |

FOREIGN PATENT DOCUMENTS

| | | |
|---|---|---|
| EP | 1326410 | 7/2003 |
| GB | 2373932 | 2/2002 |
| KR | 10-2002041098 | 6/2002 |

OTHER PUBLICATIONS

U.S. Appl. No. 10/787,173—Notice of Allowance dated Aug. 24, 2012.

* cited by examiner

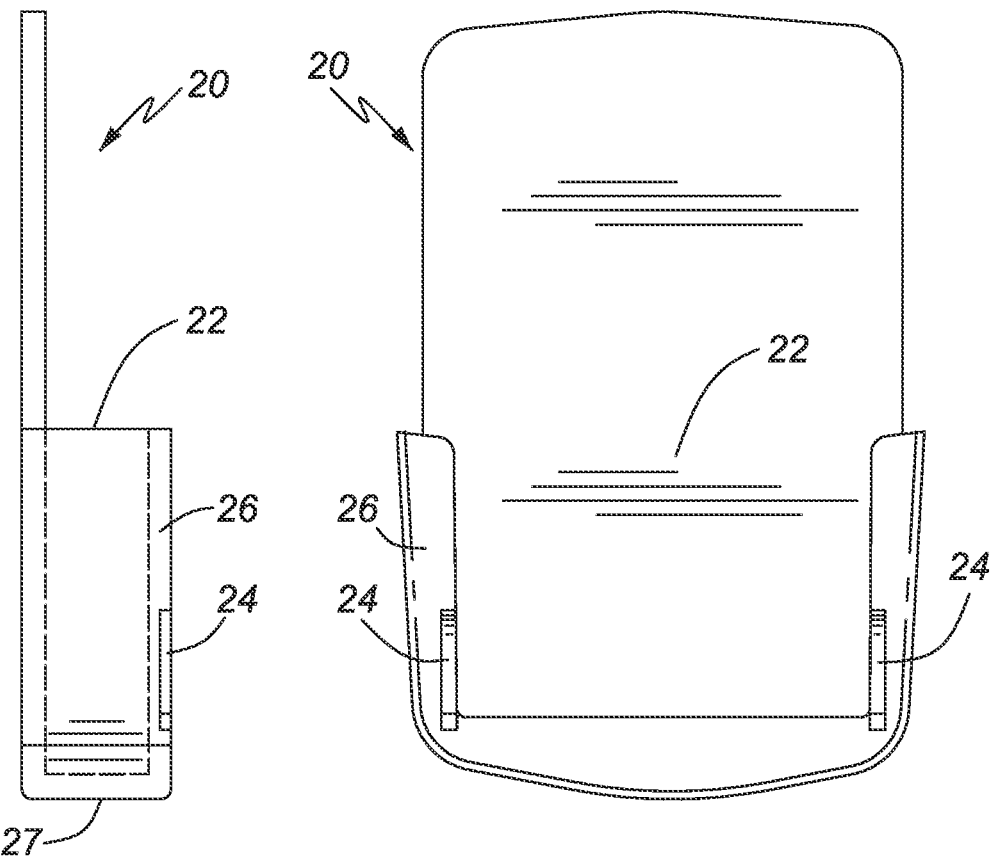
FIG. 1A
FIG. 1B
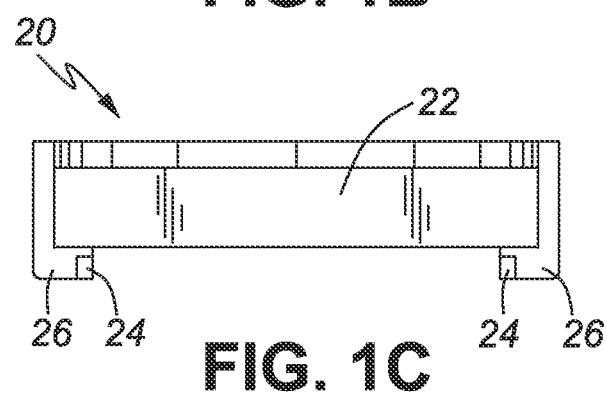
FIG. 1C

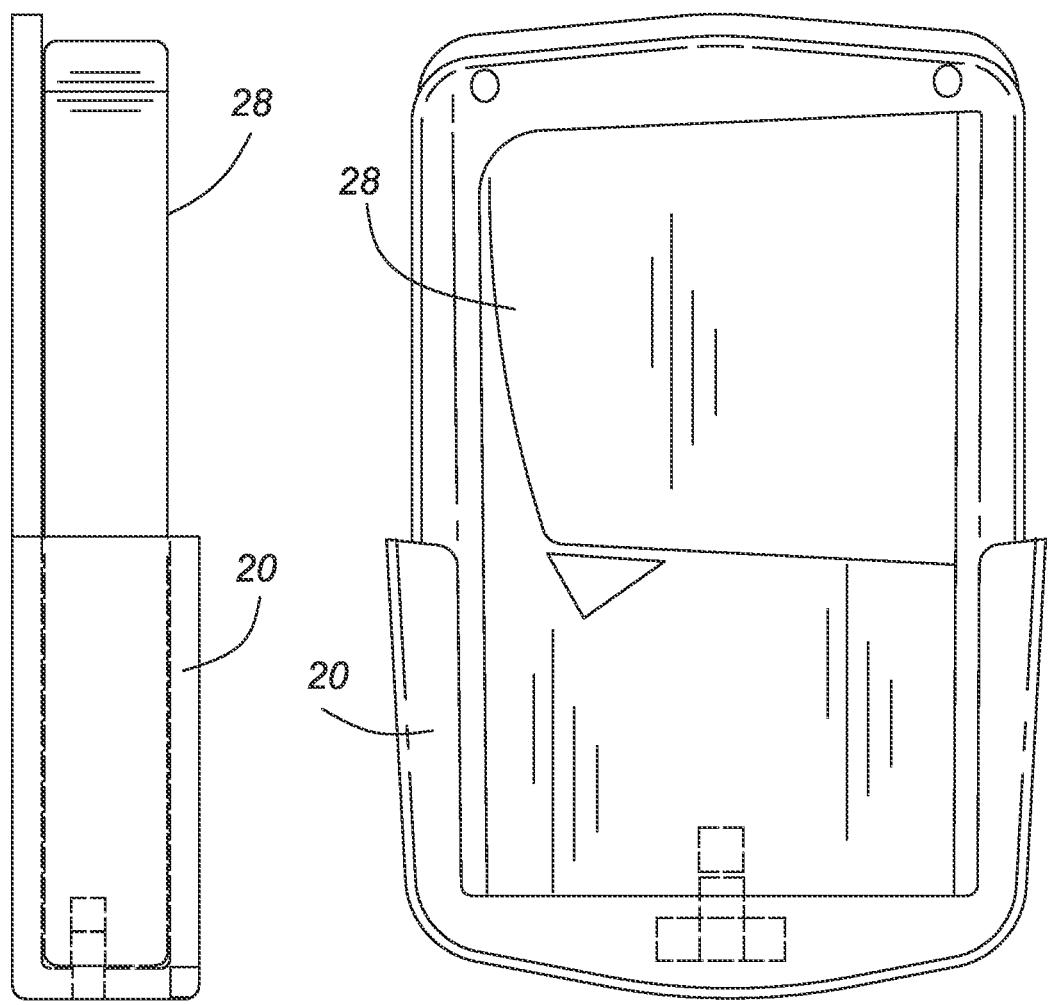
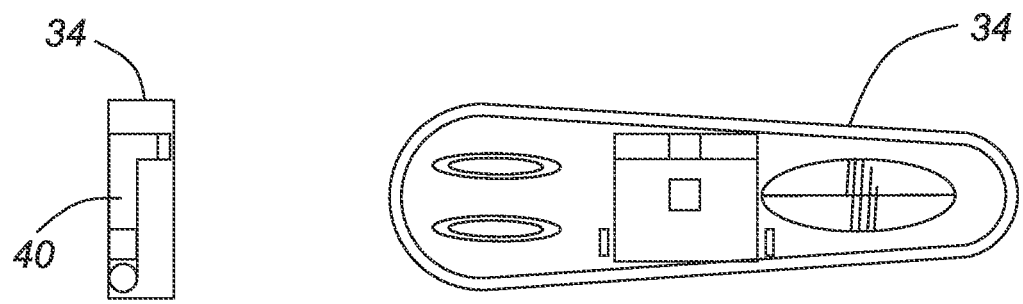
FIG. 9A        FIG. 9B

HOLSTER FOR SUPPORTING AND CHARGING THE WIRELESS HEADSET OF HANDHELD DEVICES

FIELD OF THE INVENTION

The present invention generally relates to holsters for mobile devices and their peripherals. More particularly, the present invention relates to a structure for supporting peripherals to allow them to be charged by the mobile device.

BACKGROUND OF THE INVENTION

Peripheral devices are increasingly used in conjunction with handheld devices. Wireless headsets, for example, add functionality to cellular phones. Additionally, an increasing number of portable digital cameras are designed to interact with cellular phones and personal digital assistants.

It is well known that peripheral devices are subject to the competing requirements of power and size. There is an increasing demand for peripheral devices having a long-lasting power supply. Additionally, there is a desire to minimize peripheral size, which results in smaller batteries. Peripherals often use lithium ion or nickel metal hydride batteries as their power supply to provide long life, low weight, and rechargeability. Charging the batteries of a peripheral device involves docking the batteries in a charger connected to a power source such as an electrical outlet or a motor vehicle battery. Consequently, a user's enjoyment of a peripheral is often limited by having to be at home, in the office, or in the car to charge a peripheral. This also results in the user having to manage the changing of two separate devices, the main unit and the peripheral device.

Peripherals and handheld devices are typically carried in carrying cases rather than holsters. Carrying cases have several pockets whereas holsters typically have a sleeve. Although the smaller size of holsters makes them desirable for holding peripherals, holsters are normally designed to hold only one item at a time, either a handheld device or a peripheral. Carrying cases hold peripherals in pockets which are closed using a fastener such as a zipper or hook and loop fastener such as those made by Velcro™. Retrieving the peripheral entails fiddling with the fastener of a carrying case, which is cumbersome.

It is, therefore, desirable to provide a holster for holding both a handheld device and a peripheral device so that the handheld device charges the peripheral device.

SUMMARY OF THE INVENTION

It is an object of the present invention to obviate or mitigate at least one disadvantage of previous holsters in relation to the charging and carrying peripheral devices.

In a first aspect, the present invention provides a holster for receiving and retaining a mobile device in a sleeve. The holster can also receive and retain a peripheral device. The holster comprises a mating structure, such as a tongue for connecting with a groove. The mating structure is for holding the peripheral device in electrical contact with the mobile device retained in the sleeve. The holster holds the peripheral device in such a way so as to permit the mobile device to charge the peripheral device. In a preferred embodiment, the mobile device is a cellular phone interacting with its peripheral, a headset, over a Bluetooth™ communication channel.

The mobile device has a charging port. The peripheral device has a charging contact and a mating structure, such as a groove for connecting with the tongue. Other examples of mating structures include retaining brackets, magnets, tabs, latches, flanges, hooks, clamps, and friction fits. The holster mating structure connects with the peripheral device mating structure to releasably hold the peripheral device. The holster mating structure holds the peripheral device mating structure in such a way so as to permit the mobile device to charge the peripheral device. The charging port is in direct electrical contact with the charging contact.

In another embodiment, the charging port is in electrical contact with the charging contact through an adapter which is housed in the holster.

In a further embodiment the adapter includes a controller for regulating charging.

In another embodiment, the holster includes a base for supporting the mobile device in the sleeve. This base has an aperture for receiving the charging contact and allowing it to make electrical contact with the charging port.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1A illustrates a side view of the holster according to an embodiment of the present invention;

FIG. 1B illustrates a front view of FIG. 1A;

FIG. 1C illustrates a top view of FIG. 1A;

FIG. 9A illustrates a side view of a mobile device held by a holster of the present invention, aligned to receive peripheral device;

FIG. 9B illustrates a front view of the mobile device, holster and peripheral device of FIG. 9A;

DETAILED DESCRIPTION

Figures 2A, 2B:
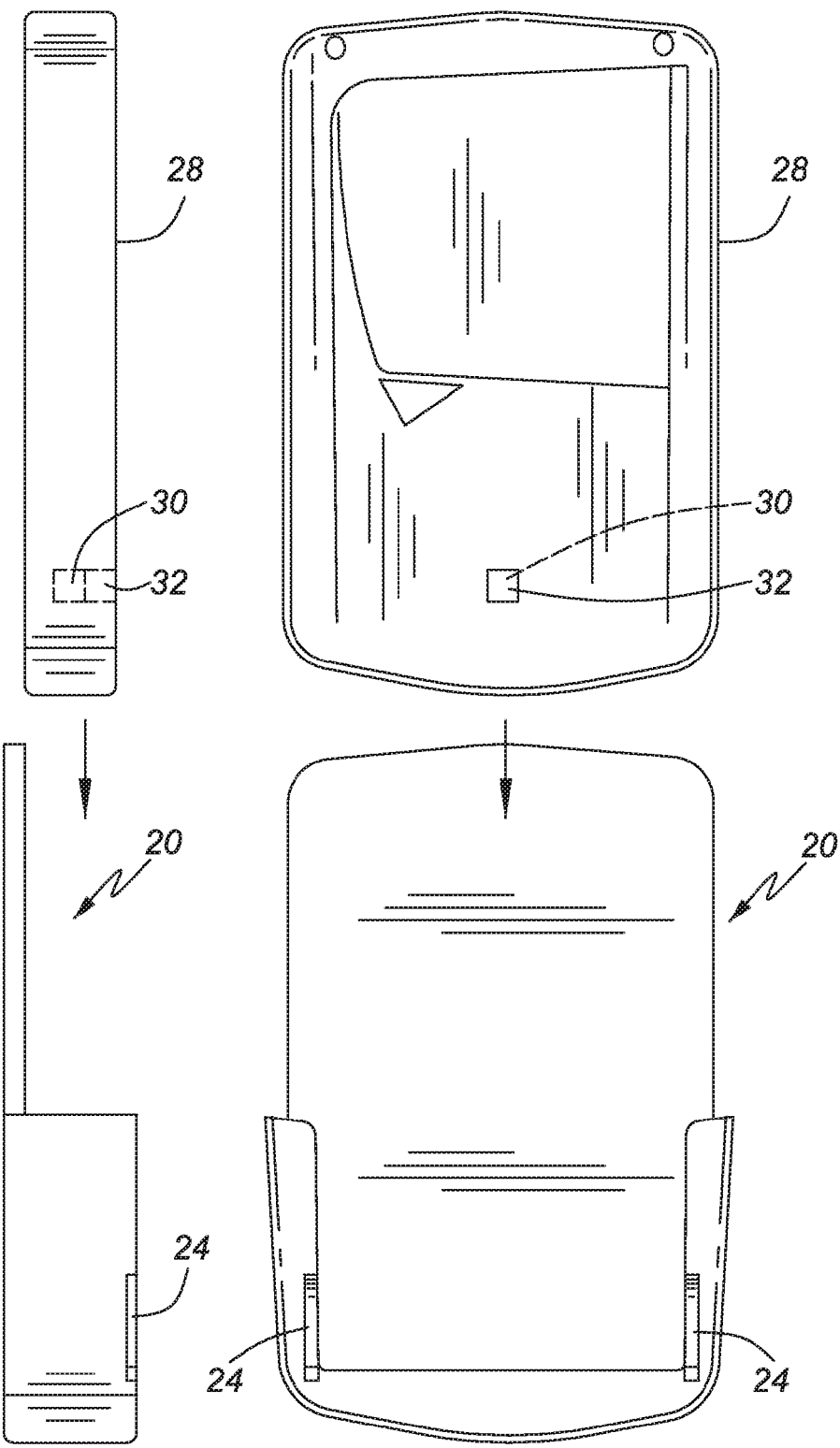
FIG. 2A illustrates a side view of the holster and a mobile device according to an embodiment of the present invention.
FIG. 2B illustrates a front view of FIG. 2A.

Generally, the present invention provides a holster for holding both a peripheral device and a mobile device. More specifically, the present invention provides a holster for holding both a mobile device and a peripheral device to permit the mobile device to charge the peripheral device.

Typically users of peripheral devices such as wireless headsets or digital cameras that interface with a mobile device require a mobile charging station to be carried with them. This results in a net increase in the number of items a user is required to carry. The present invention negates the need to carry a mobile charging station by providing a holster to hold both the mobile device and the peripheral device, so that they are in electrical contact with each other, allowing the peripheral device to recharge its battery from the mobile device. Due to size related issues, peripheral devices typically have smaller batteries than mobile devices, and shorter battery lives. By allowing a peripheral device to be charged by a mobile device while both devices are idling, the peripheral device is given an effectively longer battery life. In a presently preferred embodiment, the holster supports the peripheral device in such a way that when the peripheral is held for charging, the mobile device can be removed for use while the peripheral device remains securely retained by the holster.

FIG. 1A shows a side view of a holster of the present invention. Holster 20 has a back panel, a base portion 27, and side wall portions 26 which define sleeve 22 designed for receiving a mobile device. Also illustrated in FIG. 1A is a mating structure 24 in side wall 26 to allow a peripheral device to mate with a holster. One skilled in the art will readily appreciate that there are a number of implementations for such a mating device. These may include grooves with bosses or flanges to retain a mobile device after it is slid into place, magnets, or other physical means of engaging a peripheral device. FIG. 1B shows a front view of the holster illustrated in FIG. 1A. Holster 20 has two side walls 26 each having its own mating structure 24, the side walls 26 helping to define the sleeve 22. FIG. 1C illustrates the top view of the holster of the FIGS 1A and 1B. As can be seen from FIG. 1C holster 20 has a sleeve 22 defined by side walls 26. Each side wall 26 has a mating structure 24. Examples of mating structures include retaining brackets, magnets, tabs, latches, flanges, hooks, clamps, and tongue-and-groove assemblies. Additionally, one skilled in the art will appreciate that in place of mating structure 24 there can be offered a peripheral sleeve adjacent to the sleeve 22 for holding the mobile device.

Figure 3A:
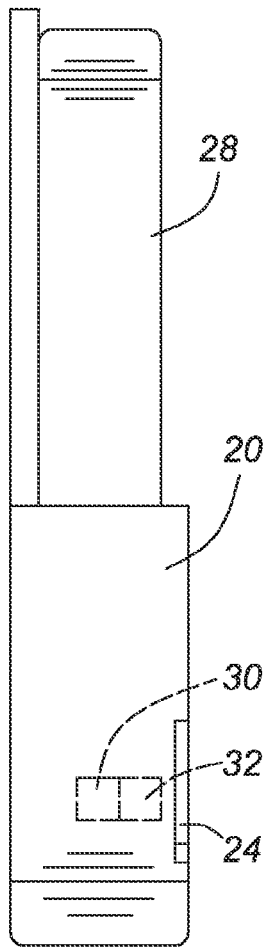
FIG. 3A illustrates a side view of the holster retaining the mobile device according to an embodiment of the present invention.
Figure 3B:
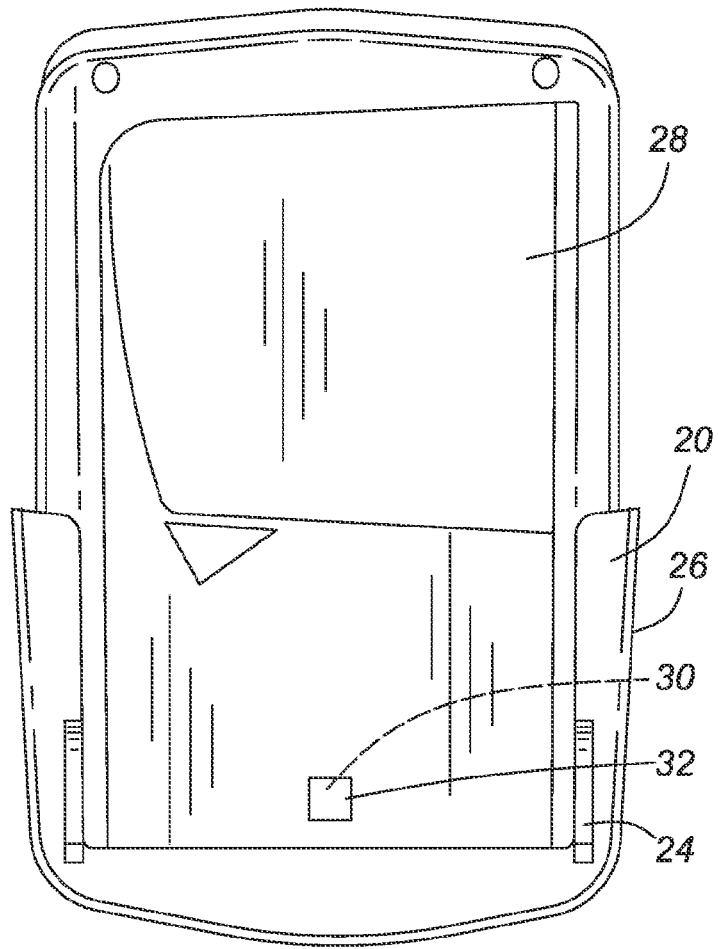
FIG. 3B illustrates a front view of FIG. 3A.

FIG. 2A illustrates a side view of the holster of FIG. 1, and a mobile device 28 for being retained in the sleeve. Mobile device 28 has a charger 30 connected to a charging port 32. FIG. 2B illustrates the mobile device 28 and holster 20 from a front view. FIGS. 3A and 3B provide side and front views respectively of mobile device 28 contained in the sleeve of holster 20. As can be seen from FIGS. 3A and 3B, the sleeve retains mobile device 28 so that charger 30, and charging port 32 are accessible from the front opening of the holster defined by the side walls 26. Additionally, mating structure 24 is aligned so that a peripheral device will be held on holster 20 so that it has access to both charging port 32 and charger 30.

Figure 4A:
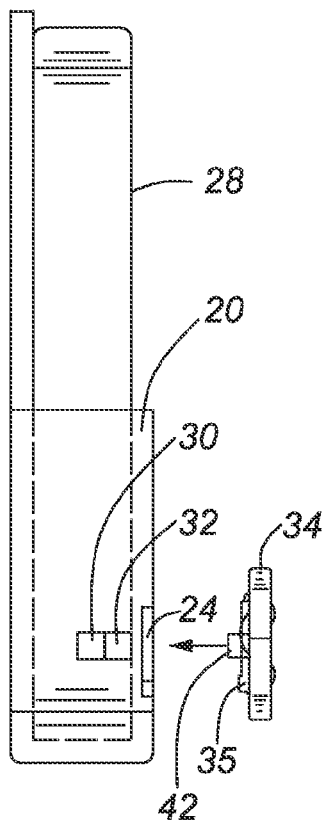
FIG. 4A illustrates a side view the peripheral device with a holster retaining the mobile device according to an embodiment of the present invention.
Figure 4C:
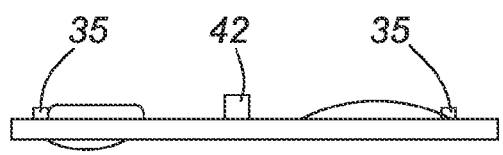
FIG. 4C illustrates a top view of the peripheral device in FIG. 4A.
Figure 4B:
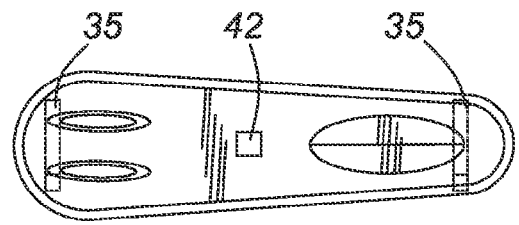
FIG. 4B illustrates a front view of the peripheral device in FIG. 4A.

FIG. 4A illustrates a side view of a peripheral device 34 and holster 20 retaining mobile device 28. Peripheral device 34 has two mating structure 35 and a charging contact 42. As shown in FIGS. 4B and 4C, mating structure 35 and charging contact 42 are accessible from the front of peripheral device 34. Mating structures 35 and 24 are located so that they can connect. Charging contact 42 is positioned such that connecting mating structures 35 and 24 brings charging contact 42 in electrical contact with charging port 32.

Figure 5A:
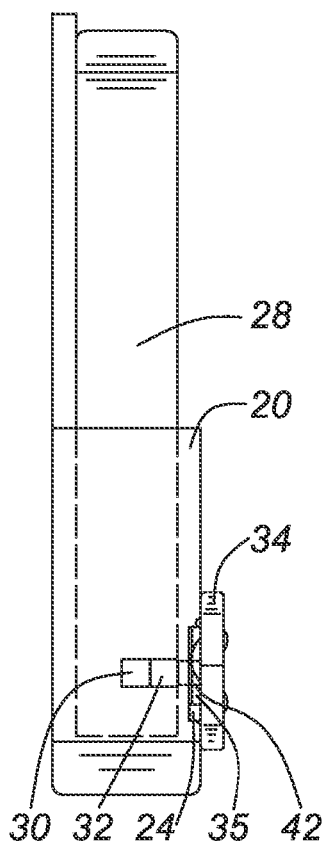
FIG. 5A illustrates a side view of the holster retaining the mobile device and peripheral device according to the first embodiment of the present invention.
Figure 5B:
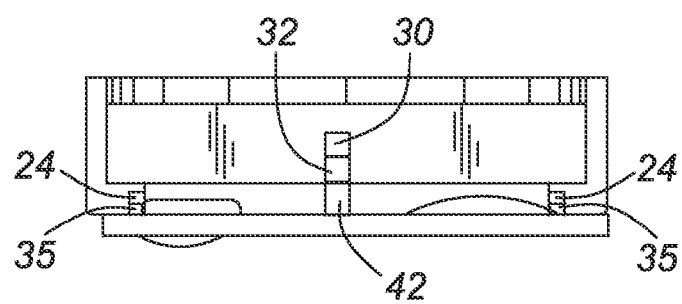
FIG. 5B illustrates a top view of FIG. 5A.

FIGS. 5A and 5B provide side and top views of peripheral device 34 mated with holster 20 and held in electrical contact with mobile device 28. Holster 20 holds mobile device 28 in its sleeve as previously described. Peripheral device 34 uses its mating structures 35 to mate with mating structure 24 on holster 20. Upon connection of mating structure 24 with mating structure 35, charging contact 42 of peripheral device 34 is placed in electrical contact with charging port 32. This allows a direct electrical contact between peripheral device 34 and mobile device 28. Mobile device 28 using charger 30 and charging port 32, which in various embodiments may be integrated into a single element, provides an electrical current to peripheral device 34 through charging contact 42. This current is used to charge the battery of peripheral device 34. One skilled in the art will readily appreciate that there are a plurality of designs for a charging unit to allow one battery-powered device to charge another. As a result, charger 30 of the mobile device 28 is able to charge peripheral device 34, while peripheral device 34 is connected to holster 20.

In one presently preferred embodiment, peripheral device 34 is a wireless headset for use with a mobile device providing voice services. Thus, a headset for use with a mobile device such as a cellular phone can be recharged by the mobile device, instead of requiring either a dedicated charger, or a desktop or vehicle charger. This allows the design of peripheral device 34 to minimize the volume and weight of a battery, while still providing an effectively long battery life. In another embodiment peripheral device 34 is a camera, and it benefits from the same advantage previously described.

Figure 6A:
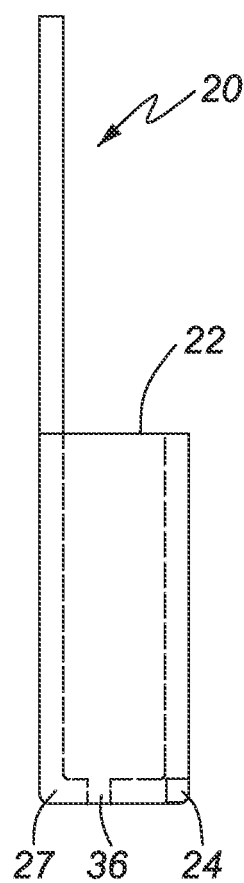
FIG. 6A illustrates a side view of the holster according to an embodiment of the present invention.

FIG. 6A illustrates a second embodiment of the present invention. There are cases where it is preferable that the peripheral device charges off the mobile device through the base of the holster. For example, holsters designed to retain a mobile device under rigorous movement include a supporting wall between side walls and located opposite the back panel. Unfortunately, the supporting wall prevents a peripheral device from making electrical contact with a mobile device. One of skill in the art will appreciate that holster designs may arise where it is preferable that charging occurs through the base of the holster.

Figure 6B:
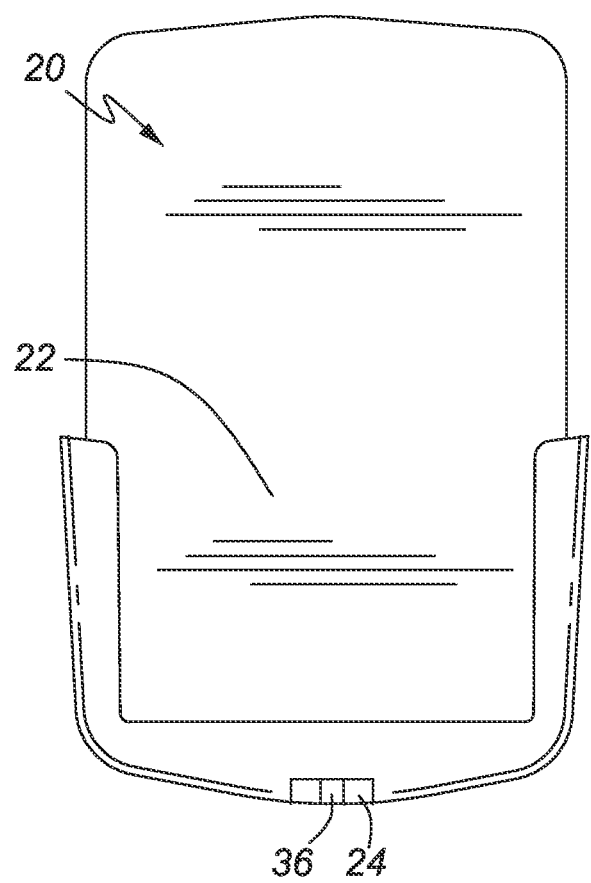
FIG. 6B illustrates a front view of FIG. 6A.

FIG. 6A shows a side view of a holster of the second embodiment of the present invention. Holster 20 has a back panel, side walls, and a base 27. The side walls, back panel and base 27 define sleeve 22 for retaining a mobile device. Base 27 also includes a mating structure 24 for securing to a peripheral device. Base 27 of holster 20 has an aperture 36 to allow a peripheral device to make electrical contact directly with the mobile device held by sleeve 22. FIG. 6B provides a front view of the holster illustrated in FIG. 6A. Holster 20 has a back panel, a sleeve 22 defined by the back panel, side walls, and base 27. In base 27 is a mating structure 24 for securing a peripheral device, and an aperture 36 to allow the peripheral device secured by mating structure 24 to make electrical contact with the mobile device held by sleeve 22.

Figure 7:
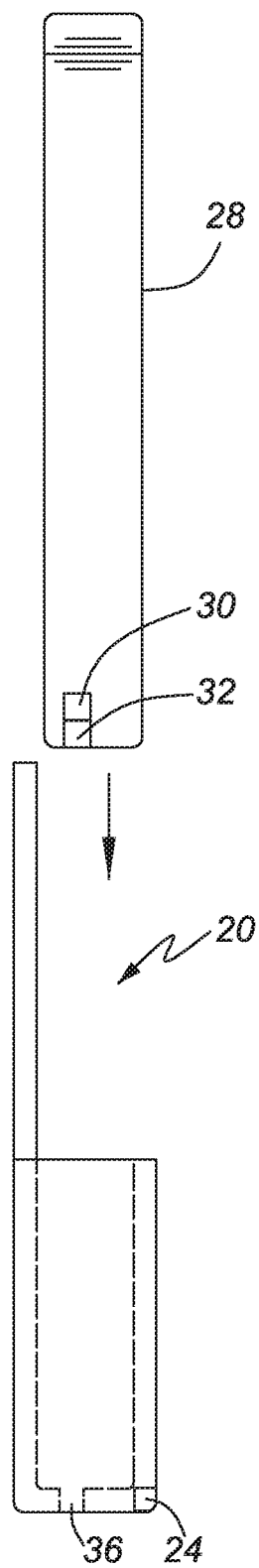
FIG. 7 illustrates a side view of the mobile device and the holster of an embodiment of the present invention.

FIG. 7 illustrates the holster illustrated in FIGS. 6A and 6B aligned to receive a mobile device 28. Mobile device 28 has charger 30 and charging port 32 located at its base to align with aperture 36.

Figure 8:
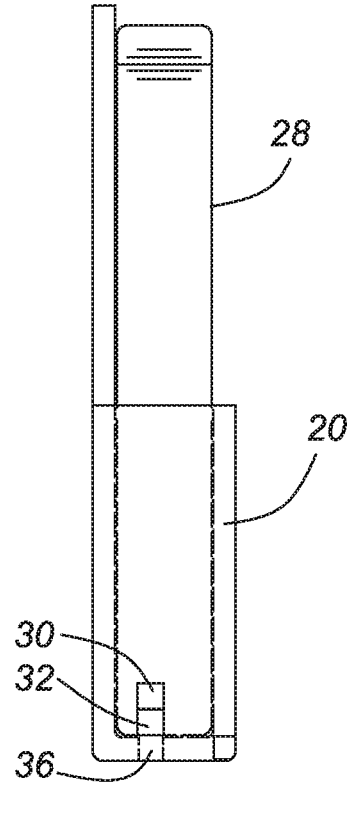
FIG. 8 illustrates a side view of the holster retaining the mobile device according to an embodiment of the present invention.

FIG. 8 illustrates mobile device 28 held in the sleeve of holster 20 with charging port 32 and charger 30 aligned with aperture 36.

FIG. 9A illustrates a side view of peripheral device 34 having a retractable, or hideable arm 40. Arm 40 can be retracted, or in the presently illustrated embodiment rotated into the body of peripheral device 34 so that while in use it is not exposed. FIG. 9B illustrates a front view of peripheral device 34, and mobile device 28 held in the sleeve of holster 20. One skilled in the art will appreciate that the charging port and charger of the mobile device 28 are aligned with the aperture in the base of holster 20.

Figure 10:
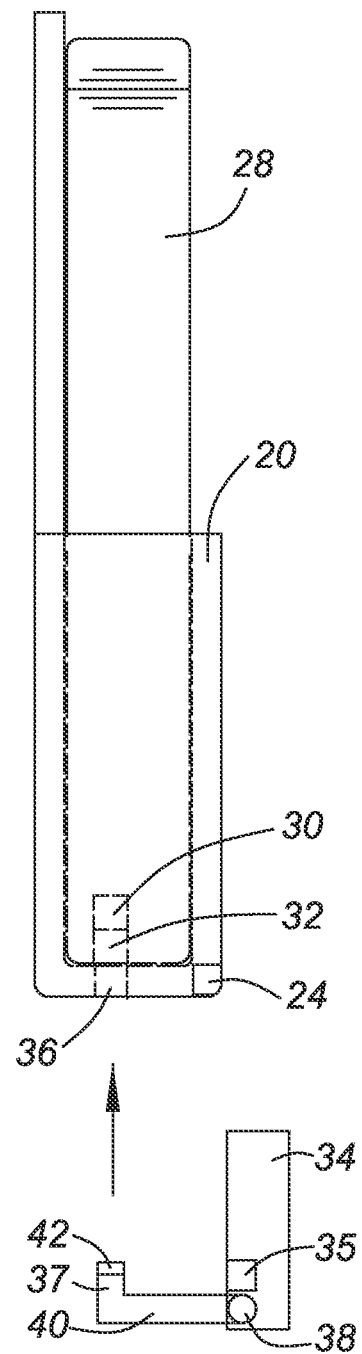
FIG. 10 illustrates a side view of the holster retaining a mobile device and the peripheral device with its arm rolled out according to an embodiment of the present invention.

FIG. 10 illustrates a side view of the holster 20 holding mobile device 28 in its sleeve such that charger 30 and charging port 32 are in alignment with aperture 36, and holster 20 is aligned with peripheral device 34 to allow peripheral device 34 to mate with the holster 20. To mate with holster 20 peripheral device 34 will engage mating structure 24 with its mating structure 35 to provide a physical connection between holster 20 and peripheral device 34. Additionally, arm 40 is in an exposed position such that a tongue 37 can be inserted into aperture 36 so that a charging contact 42 of peripheral device 34 is aligned to make contact with electrical contact 32 of mobile device 28.

Figure 11:
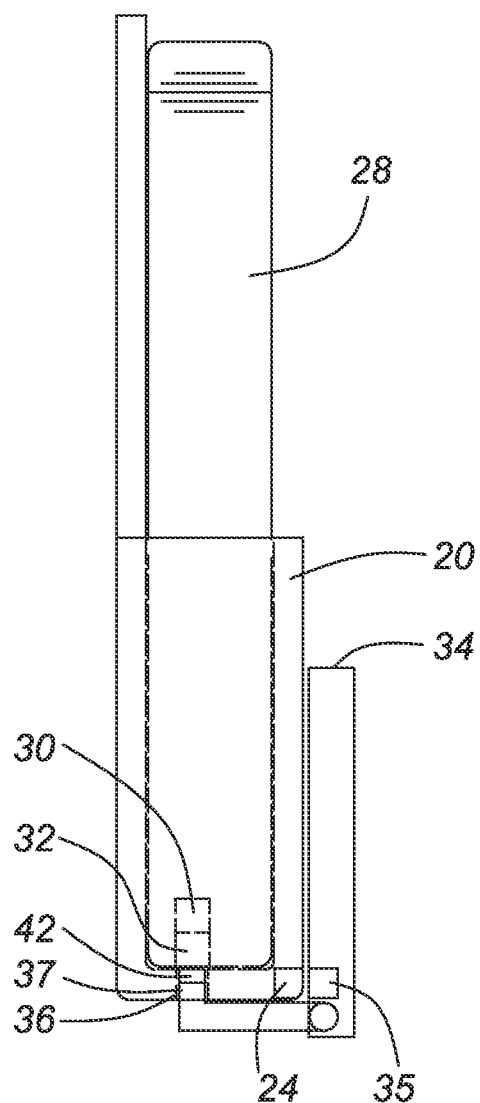
FIG. 11 illustrates a side view of the holster retaining a mobile device and a peripheral device according to an embodiment of the present invention.

FIG. 11 illustrates the engagement of peripheral device 34 with holster 20. Mating structures 24 and 35 provide a secure fastening of peripheral device 34 to holster 20. As described above, this attachment can be made using a number of known fasteners, including magnetic fastening. Charging contact 42 is in electrical contact with charging port 32 of mobile device 28 such that charger 30 can provide an electrical current to peripheral device 34 to recharge the batteries of the peripheral device. As discussed above, this provides a longer effective battery life for the peripheral device, while allowing the peripheral device 34 to carry a small capacity battery.

Figure 12A:
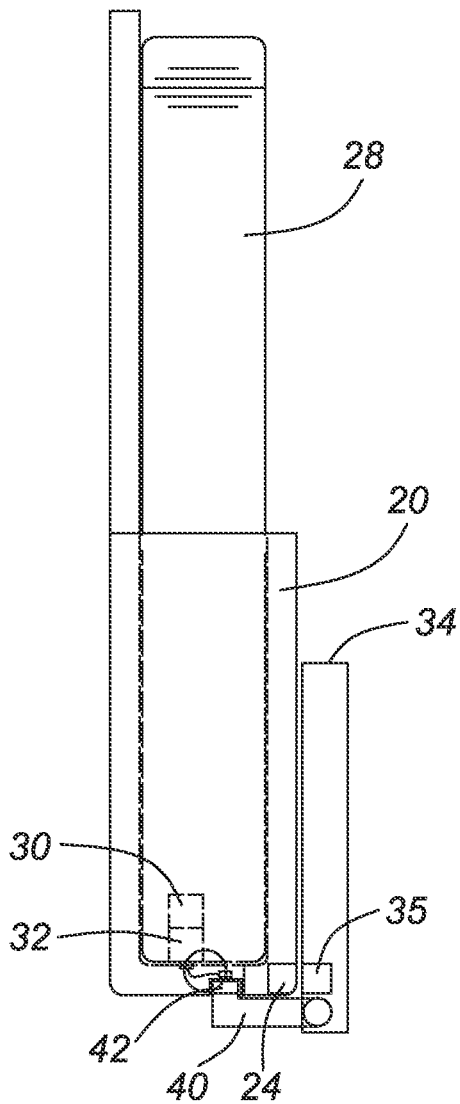
FIG. 12A illustrates a side view of a mobile device and a holster retaining a mobile device and a peripheral device according to an embodiment of the present invention.
Figure 12B:
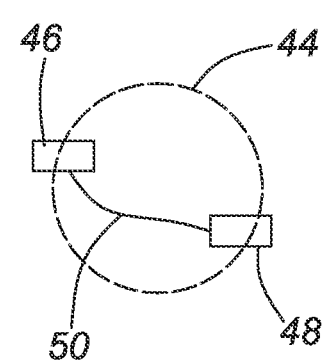
FIG. 12B illustrates the electrical connector in the holster of FIG. 12A.

FIG. 12A illustrates an alternate embodiment to the present invention, wherein charging contact 42 is put in electrical connection with charging port 32 but not in direct physical or electrical contact. Instead, charging contact 42 is placed in electrical contact with holster-peripheral terminal 48 of holster 20. Holster-peripheral terminal 48 is electrically connected to holster-mobile 46 which is in electrical contact with the charging contact of mobile device 28. Thus, holster 20 provides an indirect electrical contact to allow mobile device 28 to charge peripheral device 34. The electrical connector 44 of holster 20 is illustrated in FIG. 12B, where holster-peripheral terminal 48 is in electrical contact with holster-mobile terminal 46 and is connected thereto by lead 50.

Figure 13:
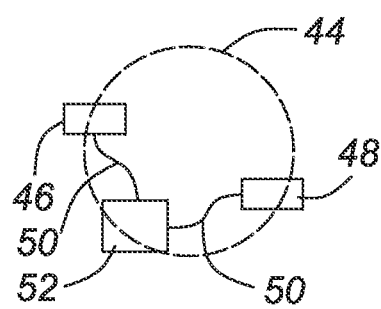
FIG. 13 illustrates an electrical connection for use in the holster of FIG. 12A.

One skilled in the art will readily appreciate that a number of alternate embodiments of the present invention can be provided such as that illustrated by FIG. 13. In FIG. 13 the indirect electrical connection 44 contains controller 52 which allows charging of the peripheral device from mobile device 28 if and only if the battery capacity of mobile device 28 exceeds a predefined level. Controller 52 prevents mobile device 28 from being drained by peripheral device 34 below a desired threshold. One skilled in the art will readily appreciate that this control structure could be placed in either peripheral device 34 or mobile device 28 as alternate designs.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A peripheral device comprising:
   a battery;
   a charging contact to provide a charge to the battery in the peripheral device; and
   a mating structure to releasably retain the peripheral device to a holster mating structure on a holster and to place the charging contact in direct physical and electrical contact with a charging port of a mobile device retained within the holster so as to permit the mobile device to charge the battery in the peripheral device.

2. The peripheral device of claim 1, wherein the mobile device is a cellular phone and the peripheral device is a wireless headset.

3. The peripheral device of claim 1, wherein the peripheral device and the mobile device interact over a Bluetooth communication channel.

4. The peripheral device of claim 1, wherein the mobile device is a cellular phone and the peripheral device is a camera.

5. The peripheral device of claim 1, further comprising a controller for regulating charging of the battery in the peripheral device.

6. A system for mobile communications comprising:
   a mobile device having a charging port;
   a peripheral device, the peripheral device having:
      a battery;
      a charging contact to provide a charge to the battery in the peripheral device; and
      a mating structure; and
   a holster for receiving and retaining both the peripheral device and the mobile device, the holster having a holster mating structure for releasably retaining the peripheral device such that the charging contact and the charging port are in direct physical and electrical contact when both the mobile device and the peripheral device are retained in the holster.

7. The system of claim 6, wherein the holster includes a sleeve for releasably retaining the mobile device.

8. The system of claim 6, wherein the mobile device or the peripheral device includes a controller for regulating charging.

9. The system of claim 6, wherein the holster further includes a base for supporting the mobile device in the sleeve, the base having an aperture for receiving the charging contact and allowing it to make direct electrical contact with the charging port.

10. The system of claim 6, wherein the mating structure is selected from the group consisting of a retaining bracket, a magnet, a tab, a latch, a flange, a hook, a clamp, a friction fit, and a tongue and groove.

* * * * *